(No Model.)  
2 Sheets—Sheet 1.
A. B. PRUDEN.
BICYCLE HANGER.
No. 590,773.  
Patented Sept. 28, 1897.
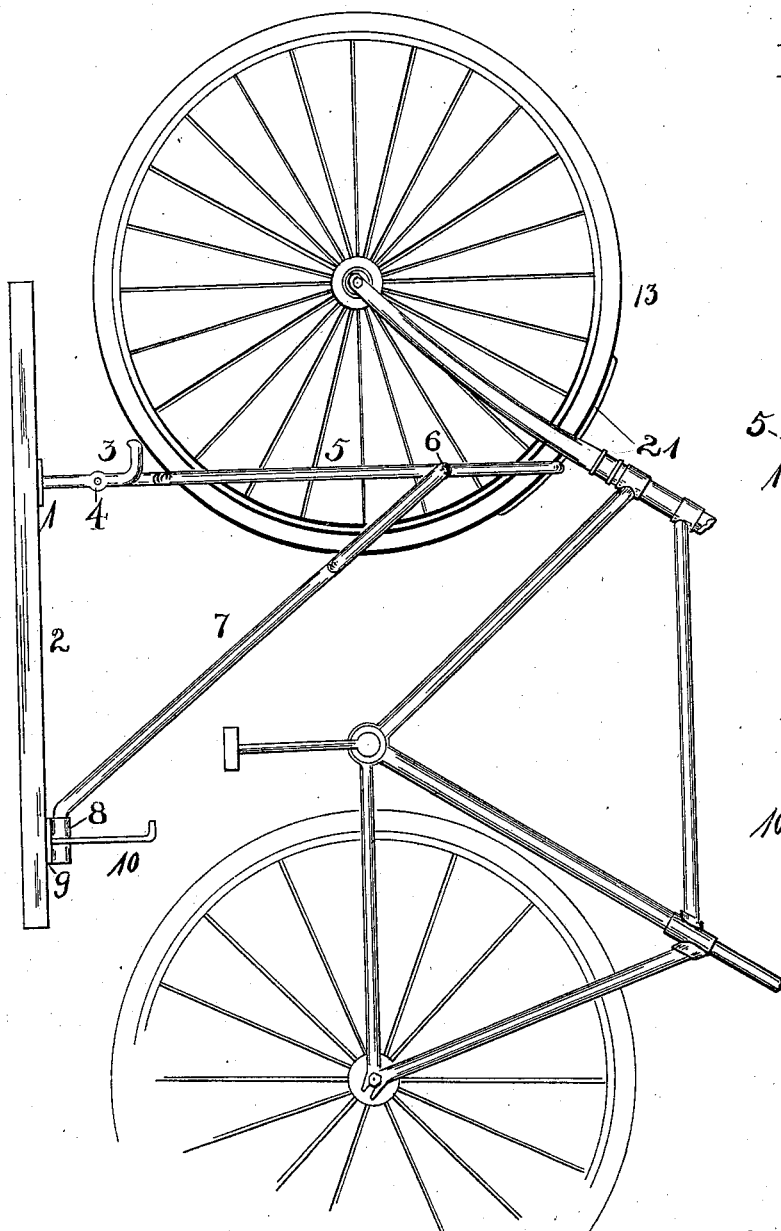
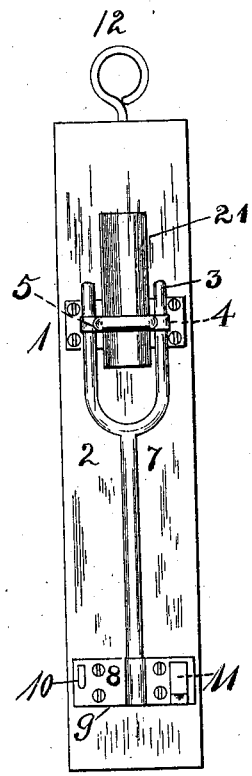
Witnesses  
Louis Berger  
Louise Gilmore
Abraham B. Pruden, Inventor  
By his Attorney A. M. Pierce.
THE NORRIS PETERS CO., PHOTO-LITHO., WASHINGTON, D. C.

(No Model.) 2 Sheets—Sheet 2.
A. B. PRUDEN.
BICYCLE HANGER.
No. 590,773. Patented Sept. 28, 1897.
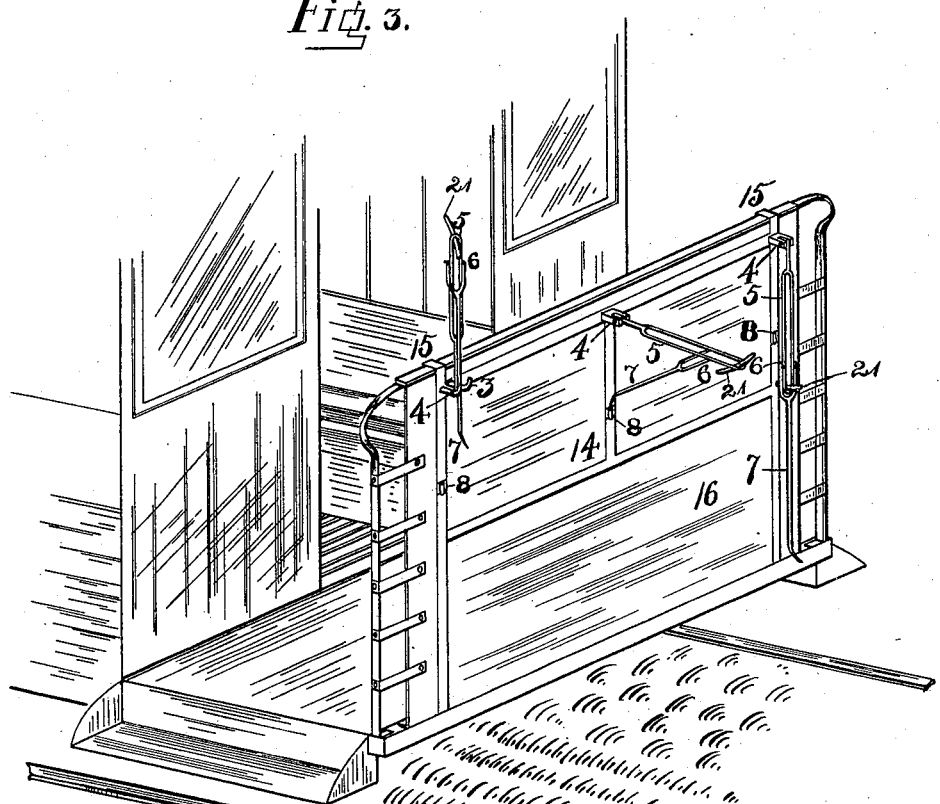
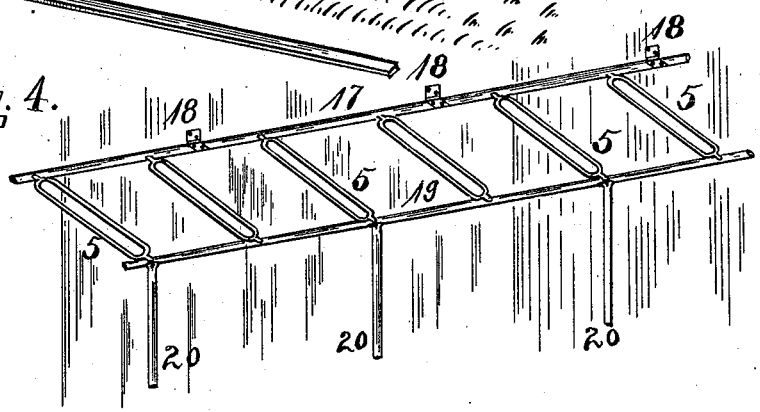
Witnesses
Louis Berger
Louise Gilmore
Abraham B. Pruden. Inventor
By his Attorney A. M. Pierce.

UNITED STATES PATENT OFFICE.

ABRAHAM B. PRUDEN, OF BROOKLYN, NEW YORK, ASSIGNOR TO BENJAMIN BLUM, OF NEW YORK, N. Y.

BICYCLE-HANGER.

SPECIFICATION forming part of Letters Patent No. 590,773, dated September 28, 1897.

Application filed April 14, 1896. Serial No. 587,540. (No model.)

*To all whom it may concern:*

Be it known that I, ABRAHAM B. PRUDEN, a citizen of the United States, residing in Brooklyn, Kings county, State of New York, have invented a new and useful Improvement in Bicycle-Hangers, of which the following is a specification.

My invention relates especially to devices employed for suspending or hanging bicycles when not in use, and has for its object the provision of a simple and effective hanger whereby the machine may be supported upon a bracket fixed to the wall and in such a position as to occupy the least possible space.

To attain the desired end, my invention consists in certain novel and useful combinations or arrangements of parts and peculiarities of construction and operation, all of which will be hereinafter first fully described, and then pointed out in the claims.

In the accompanying drawings, forming a part hereof, Figure 1 is a side view of my device, showing a bicycle hanging therein. Fig. 2 is a front elevation of the hanger with the bicycle removed. Fig. 3 illustrates my device as applied to the dashboard of a car, and Fig. 4 shows the same as assembled in a series of supports for applying to any wall.

Like numerals of reference, wherever they occur, indicate corresponding parts in all the figures.

1 is a bracket-piece arranged for securing to a base 2 or directly to a wall, as desired. This bracket-piece 1 may be provided with hooks 3. Hinged at 4 to the bracket-piece is an oblong wheel-holder 5, having at its front a plate 21 to prevent injury to the wheel-tire. Pivoted at 6 to the wheel-holder 5 is a bifurcated prop-piece 7, arranged at its lower extremity to removably enter a socket 8. The socket 8 projects from a plate 9, secured to the base 2 or directly to a wall, said plate being provided with a hook 10 and lamp-bracket 11. When the parts are mounted upon a base, such as 2, this base may be provided with an eye 12 for suspending the whole device in the desired location.

In hanging up a bicycle the front wheel 13 is passed into the holder 5, the rear wheel resting upon the floor or against the wall when the hanger is placed at a greater elevation than will permit the rear wheel to reach the floor. In my device the machine occupies only half the room required when resting at full length upon the floor or when suspended in the same position, thereby greatly economizing space.

The hook 10 is designed to receive a cap, coat, &c., and the bracket 11 the lamp, as the bicycle cannot be hung up with the lamp in position thereon.

When the hanger is not in use, by lifting the brace out of the socket 8 the entire device may be folded upward or dropped downward against the wall out of the way. By reversing the position of the bicycle the handle-bar may be passed over the hooks 3 when the holder 5 is not in position and the bicycle suspended in that manner.

In Fig. 3 is shown the hanger as applied to a removable framework 14, having hooks 15, arranged to pass over the dashboard 16 of a car. I have shown three hangers as mounted upon this framework, the one at the left being folded upward, that at the center being arranged for the reception of a wheel, and the hanger at the left dropped down out of the way.

In Fig. 4 a series of wheel-holders 5 are fixed to a longitudinal bar 17, hinged to the wall, as at 18, the parts of the holder being connected to a bar 19, provided with supporting legs or brackets 20, arranged to rest in or upon any convenient support. When not in use, this hanger may be folded upward or dropped downward out of the way, as before explained.

When constructed and arranged in accordance with the foregoing description, my improved hanger will be found admirably adapted to the uses and purposes for which it is intended, as it is simple and cheap in construction, neat in appearance, and is a great economizer of space.

Having now fully described my invention, what I claim as new therein, and desire to secure by Letters Patent, is—

1. In a bicycle-hanger, a folding wheel-holder, extending horizontally from a vertical support and arranged to receive the rear portion of the front wheel of a bicycle and to sustain the same in a half-inverted position by the wheel alone, substantially as shown and described.

2. A wheel-hanger in which is comprised a folding wheel-holder arranged to receive the rear portion of the front wheel of a bicycle, and a bifurcated prop-piece connected to the wheel-holder to support the same and to hold the bicycle in a half-inverted position by the wheel alone, substantially as shown and described.

3. A bicycle-hanger in which is comprised a fixed bracket; a wheel-holder hinged thereto; a bracket hinged to the wheel-holder, and a socket for the reception of the lower extremity of the said bracket, substantially as shown and described.

4. In a bicycle-hanger, a holder arranged to be held at right angles to a vertical support, and sustain a bicycle in a half-inverted position by the wheel alone, or be folded upward or downward when not in use, substantially as shown and described.

5. In a device of the character herein specified a fixed bracket-piece bearing hooks; an oblong wheel-holder hinged to the fixed bracket-piece; a prop-piece pivoted to the wheel-holder, and a fixed plate provided with a hook and lamp-bracket and a socket for the reception of the lower extremity of the prop-piece, the whole combined and arranged to operate, substantially as shown and described.

ABM. B. PRUDEN.

Witnesses:
A. M. PIERCE,
LOUISE GILMORE.